INVENTOR.
SIDNEY W. BARNES
ATTORNEY.

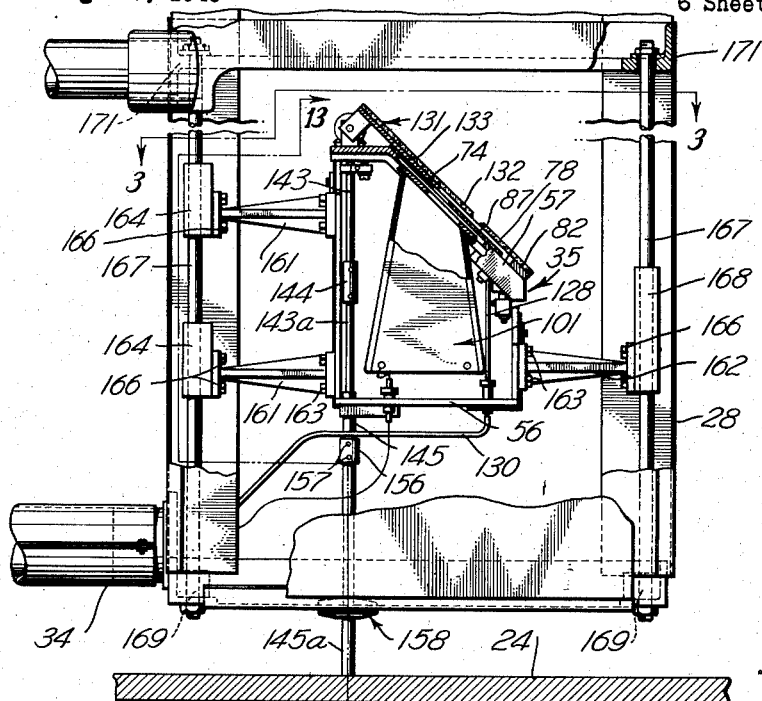
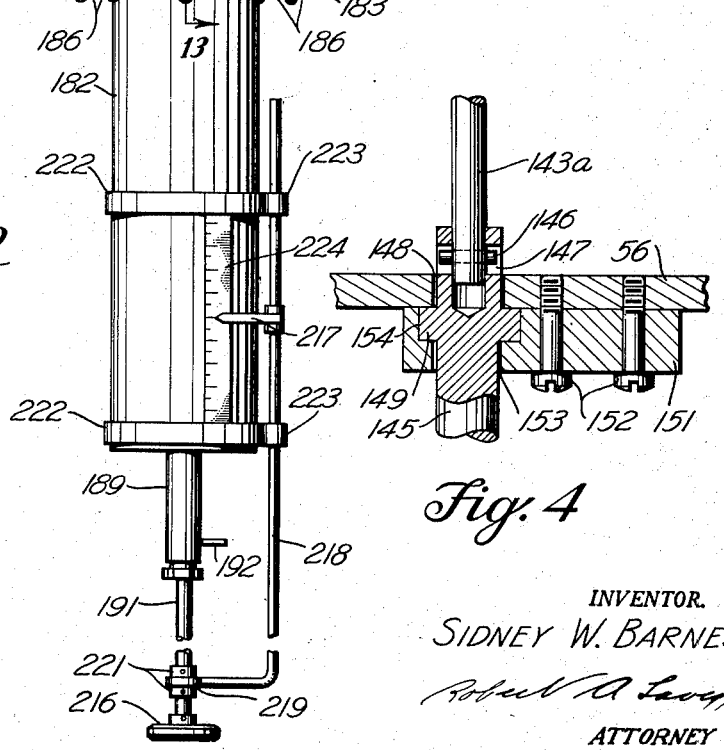

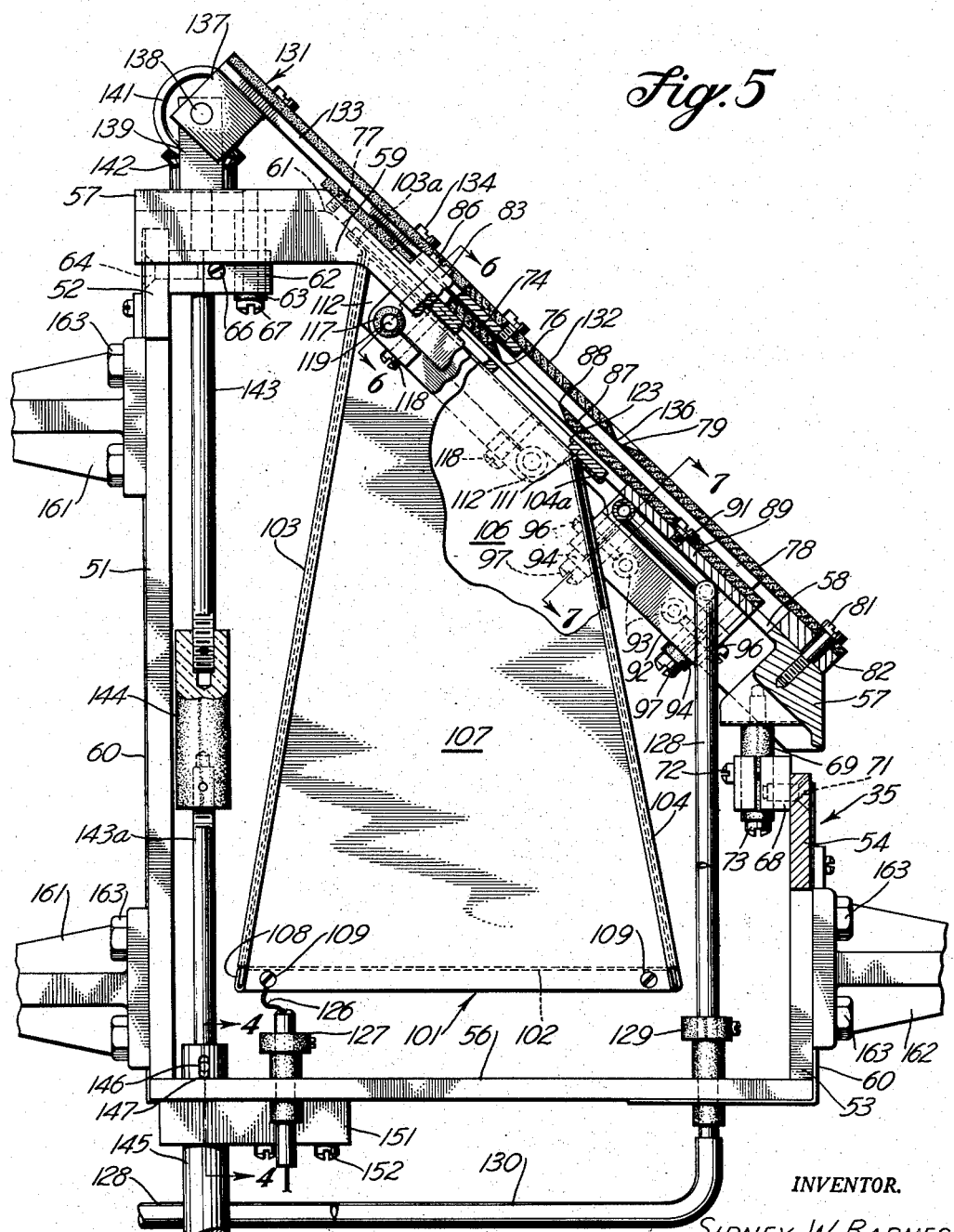

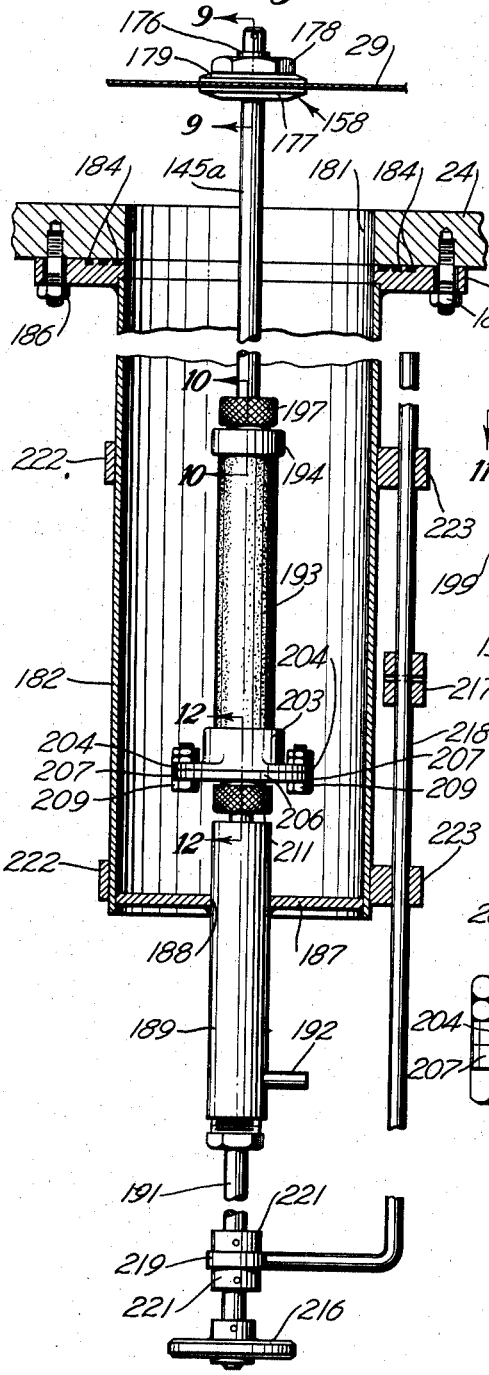
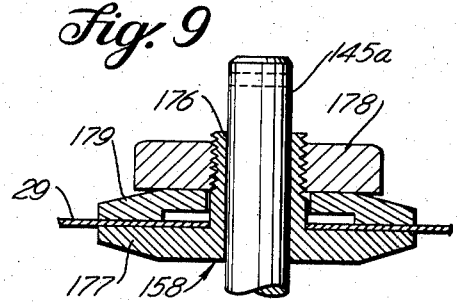
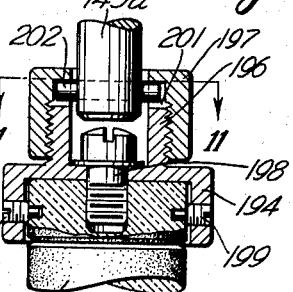
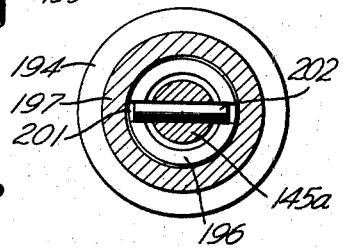
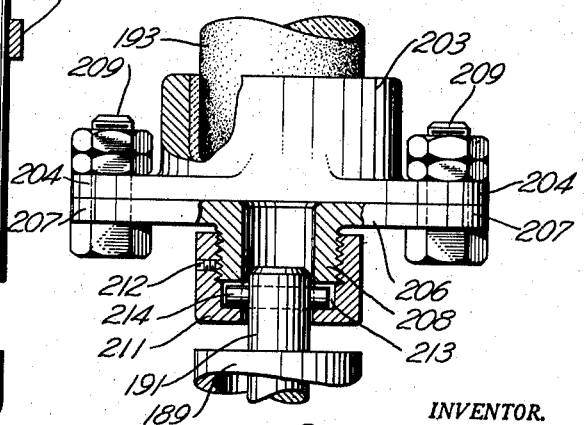
INVENTOR.
SIDNEY W. BARNES
ATTORNEY

INVENTOR.
SIDNEY W. BARNES

# United States Patent Office 2,891,162
Patented June 16, 1959

2,891,162

CALUTRON RECEIVER

Sidney W. Barnes, Rochester, N.Y., assignor to the United States of America as represented by the United States Atomic Energy Commission Application August 27, 1946, Serial No. 693,334

10 Claims. (Cl. 250—41.9)

The general subject of this invention involves the separation, based on difference in mass, of minute particles, such as atoms, and especially the separation of isotopes of an element, or the separation of a portion of an element enriched with respect to a particular isotope on a scale yielding commercially useful quantities of the collected material.

The type of means or mechanism to which the invention relates is known as a "calutron," and correspondingly the method or process is known as a "calutron" method or process. For a complete disclosure of a calutron and its mode of operation, reference is made to U.S. Patent No. 2,709,222 which issued to Ernest O. Lawrence on May 24, 1955, for "Methods of and Apparatus for Separating Materials."

The presently preferred form of the calutron comprises an evacuated tank disposed between the poles of an electromagnet so that the evacuated space within the tank is pervaded with a magnetic field of high flux density. Within the tank there is provided a "source unit" that includes means for supplying the polyisotope as a vapor or gas to an ionizing region, ionizing apparatus for producing positively ionized particles from the vapor, and an accelerating device maintained at a high negative electrical potential with respect to the ionizing apparatus for withdrawing the positive ions and imparting to each of them a predetermined energy in the form of substantially uniform velocities along paths generally normal to the direction of the magnetic field from a linear virtual focus toward an elongated beam defining slit in the accelerating device disposed generally parallel to the direction of the magnetic field.

After passing through the beam defining slit, the accelerated ions continue to move transversely to the magnetic field and are constrained to travel along substantially arcuate paths having radii that vary with the masses of the particles (within a magnetic field of uniform intensity). The paths for the ions of a given mass diverge to either side of a median path to an extent determined by the geometry of the ionizing and accelerating devices and by such inhomogeneity as may exist in the magnetic field through which the ions travel. This divergence of the paths of travel of the ions of a given mass continues through the first 90° of arcuate travel from the virtual focus at the source unit, and then the paths converge during the next 90° and cross each other in a region of focus approximately 180° from the virtual focus. Thus, in effect, geometrical focusing of a ribbon-shaped stream of ions of a given mass is accomplished adjacent the 180° point, even though there is a relatively wide initial angle of divergence of the ions. Likewise, the ions of any other given mass travel along paths that define a ribbon-shaped stream coming to a similar focus approximately 180° from the virtual focus at the source unit.

A receiver is disposed within the vacuum tank adjacent the 180° foci of the isotope ions to be separated, for de-ionizing them and for separately collecting material from one or all of them as may be desired.

The present invention relates to calutron receivers and it is a general object of the invention to provide an improved receiver and mounting structure therefor.

A further object of the invention is to provide an improved mounting structure for a calutron receiver that is operative from outside the calutron tank to adjust the position of the receiver with respect to the beam to be received thereby.

A further object of the invention is to provide a calutron receiver and mounting structure therefor in which a single control member projecting through the tank wall may be employed both to adjust the position of the receiver with respect to the beam to be received thereby and to operate a door adapted to close the receiver against the admission of ions when beam conditions are not proper for reception.

A further object of the invention is to provide an improved pocket design for a calutron receiver adapted to retain a maximum percentage of the ions entering the pocket.

Additional objects and advantages of the invention will appear from the following description of a preferred embodiment thereof, taken in conjunction with the accompanying drawings in which:

Fig. 2 is a plan view on an enlarged scale of the receiver shown in Fig. 1 and of certain adjacent structure, the view being partly in section and partly broken away to show the mounting of the receiver and the general interior construction thereof;

Fig. 4 is a fragmentary sectional view of the receiver, taken as indicated by the line 4—4 in Fig. 5;

Fig. 5 is a plan view of the receiver on a further enlarged scale, similar to the view thereof shown in Fig. 2, with certain parts broken away to show the interior structure of the receiver;

Fig. 8 is a horizontal sectional view on an enlarged scale of structure for adjusting the receiver that is shown in plan in Fig. 2;

Fig. 9 is a fragmentary sectional view of the structure shown in Fig. 8, taken as indicated by the line 9—9 in Fig. 8;

Fig. 10 is a fragmentary sectional view of the structure shown in Fig. 8, taken as indicated by the line 10—10 in Fig. 8;

Fig. 11 is a sectional view of the structure shown in Fig. 10, taken as shown by the line 11—11 in Fig. 10;

Fig. 12 is a fragmentary sectional view of the structure shown in Fig. 8, taken as indicated by the line 12—12 in Fig. 8.

Figure 1:
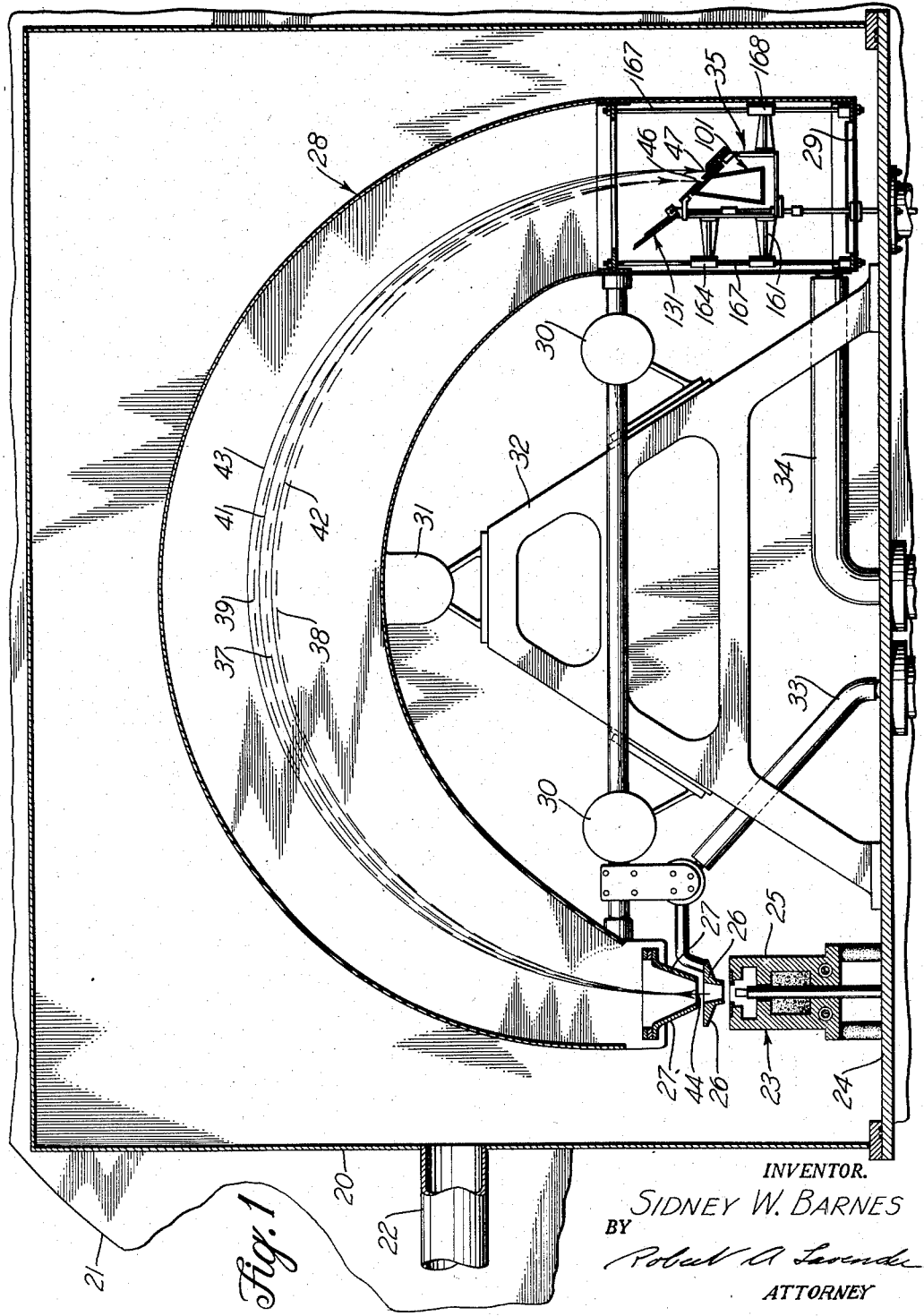
Figure 1 is a plan view of a calutron tank, partly in section, showing the arrangement of the source unit and the receiver within the tank and the relation of the tank to the magnet, certain parts being shown somewhat schematically for simplicity.
Figure 3:
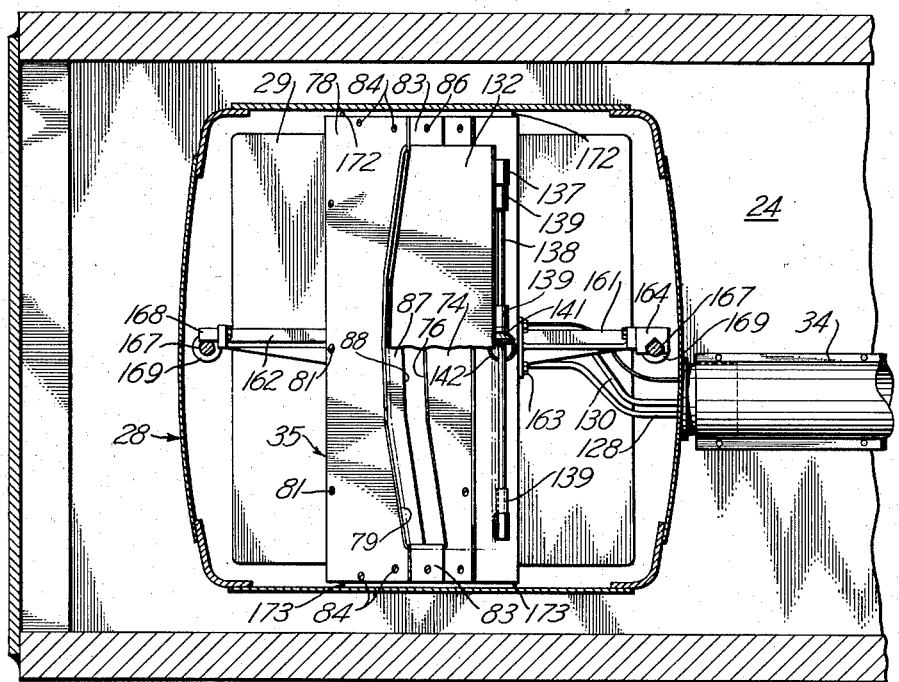
Fig. 3 is a vertical sectional view of the structure shown in Fig. 2, taken as indicated by the line 3—3 in Fig. 2.
Figure 6:
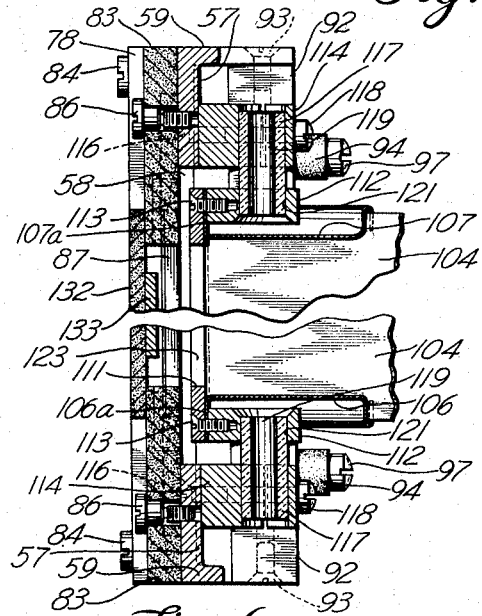
Fig. 6 is a fragmentary sectional view of the receiver, taken as indicated by the line 6—6 in Fig. 5.
Figure 7:
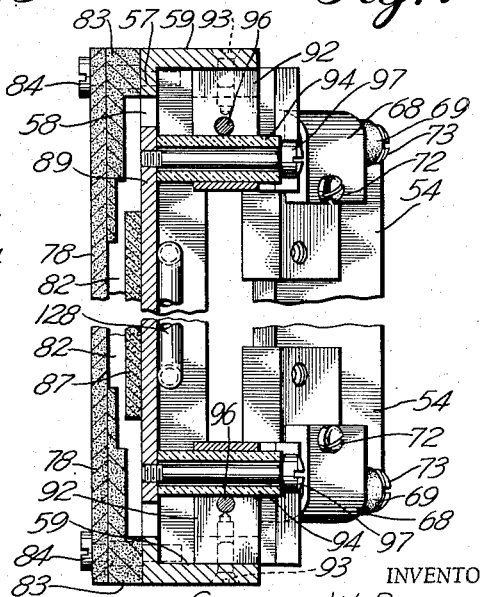
Fig. 7 is a fragmentary sectional view of the receiver, taken as indicated by the line 7—7 in Fig. 5.
Figure 13:
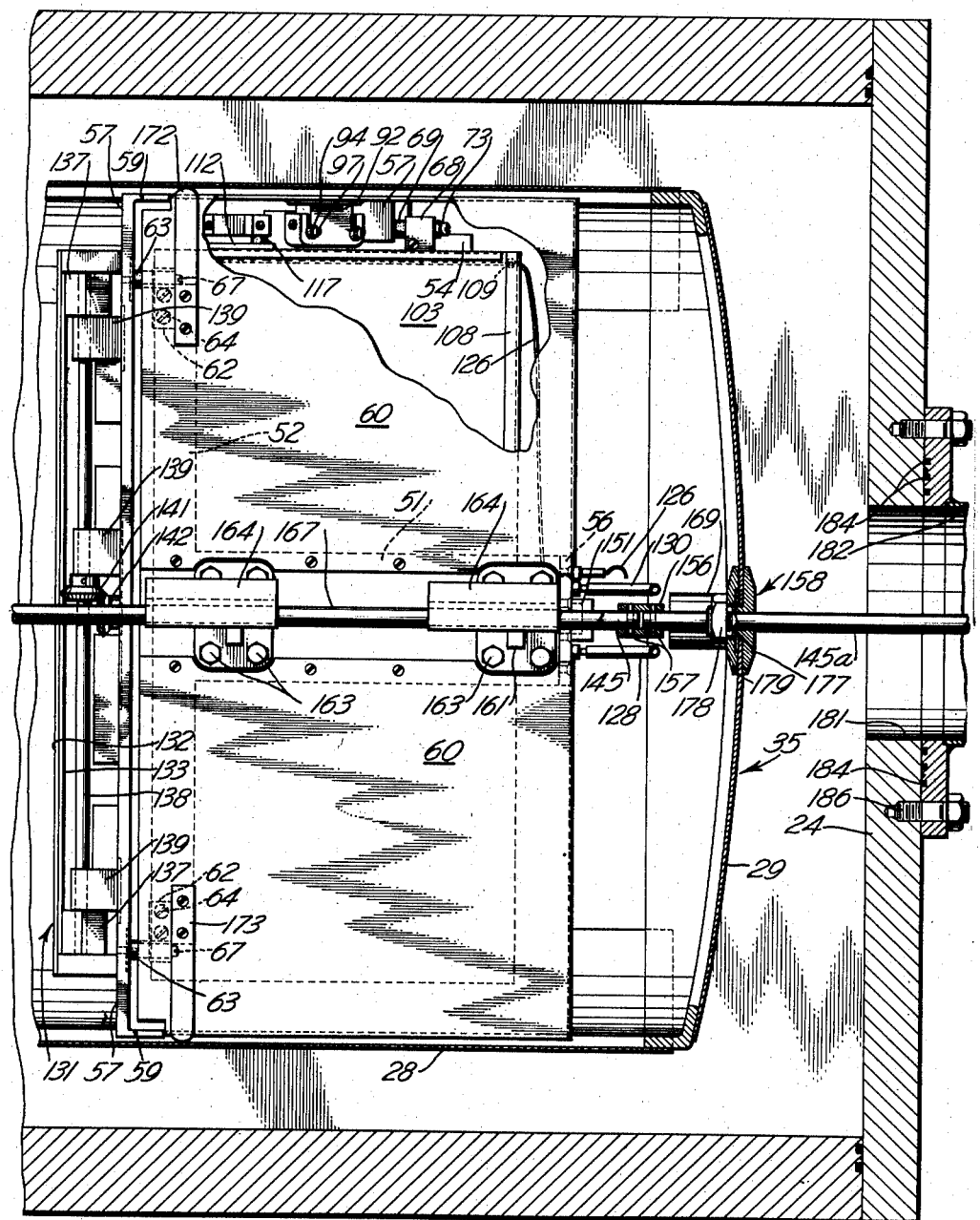
Fig. 13 is a fragmentary sectional view of the structure shown in Fig. 2, taken as indicated by the line 13—13 in Fig. 2.

Referring first to Fig. 1, there is illustrated a calutron of the general character disclosed in the Lawrence patent, mentioned above, but embodying certain modifications including, among other features, a receiver constructed in accordance with the present invention for receiving a magnetically shimmed ion beam. The calutron comprises a tank 20, rectangular in plan, that is supported midway between a pair of horizontally disposed, vertically spaced-apart, pole faces 21 (only one being shown) of a calutron magnet, whereby a magnetic field may be created throughout the interior of the tank with the magnetic lines of force passing upwardly therethrough. The tank is adapted to be evacuated through a pump-out conduit 22 to reduce the interior pressure, in a manner disclosed in the above-mentioned Lawrence Patent. For purposes of illustration, the tank may be considered as being provided with magnetic shims (not shown) for modifying an ion beam passing through the tank, in the manner and for the purpose disclosed in U.S. Patent No. 2,719,924, which issued on October 4, 1955, to Julius Robert Oppenheimer et al.

A source unit, illustrated schematically in Fig. 1 and generally designated 23, is mounted within the tank 20 adjacent one side of a removable wall or face plate 24 thereof. The source unit 23 is adapted to produce, from a polyisotopic charge material, a beam of singly ionized positive ions travelling along substantially arcuate paths from the source unit toward a region of focus approximately 180° along said paths adjacent the opposite side of the tank face plate 24. As hereinbefore indicated, the source unit is designed to project the ions of any given mass along paths that are initially divergent to either side of a median path by various angles between predetermined maxima and that later converge toward and diverge beyond the 180° region of focus at angles to either side of a median path dependent upon their respective initial angular divergences and upon the effects of the modified magnetic field through which the ions travel. To accomplish this, the source unit 23 is provided with a source block 25 in which the charge material is vaporized and ionized. A pair of spaced-apart, ion-accelerating electrodes 26, maintained at a high negative electrical potential with respect to the source block 25, is disposed in front of the source block for withdrawing positive ions therefrom and imparting to the ions substantially uniform kinetic energies in the form of velocities directed between the electrodes 26. A second pair of spaced-apart electrodes 27 is disposed ahead of the electrodes 26 and is maintained at a negative potential with respect to the source block 25 somewhat less than the potential of the electrodes 26 for partially decelerating the ions accelerated by the electrodes 26 as they travel toward the gap between the electrodes 27. For a more detailed description of the purpose and mode of operation of the electrodes 26 and 27, reference is made to U.S. Patent No. 2,725,478 which issued on November 29, 1955, to Byron T. Wright.

The ions projected from the source unit 23 in the manner described above travel through a generally crescent-shaped liner 28 having one open end attached to the electrodes 27 and an opposite end closed by a wall 29. The liner 28 is maintained at the same electrical potential as the electrodes 27, so that ions passing therethrough travel in a substantially uniform electric field, and is suitably supported on and insulated from structure carried by the removable wall 24 of the tank, this structure including a pair of similar insulators 30, a third insulator 31, and an A-frame 32. A suitable conduit 33 is provided through which electrical leads from the electrodes 26 may be passed to the outside of the tank, and another suitable conduit 34 is provided through which electrical leads from the opposite end of the liner 28 may be passed to the outside of the tank. These conduits are constructed with suitable vacuum seals (not shown) for preventing the leakage of air therethrough into the tank and are suitably insulated from the structure inside the tank on which they are supported.

An ion receiver, generally designated 35, is disposed within the liner 28 adjacent the end wall 29 thereof for receiving the ions projected from the source unit 23 in a manner described in more detail hereinafter.

The beam projected from the source unit 23 through the liner 28 to the receiver 35 is schematically and somewhat ideally illustrated in Fig. 1 by two sets of three lines each, one set of dash lines representing a median path 37 and two extreme paths 38 and 39 of a stream of ions of one isotope, and the other set of solid lines representing a median path 41 and two extreme paths 42 and 43 of a stream of ions of another heavier isotope. The two streams of ions originate at a linear virtual focus 44 extending a vertical distance (normal to the plane of Fig. 1) that is dependent upon dimensions and other characteristics of the source unit extrinsic to considerations of present interest. The stream of ions represented by the first-mentioned set of lines 37, 38, and 39 converges toward and diverges beyond a 180° focus 46, and, similarly, the stream of heavier ions represented by the second-mentioned set of lines 41, 42, and 43 converges toward and diverges beyond a second 180° focus 47 that is laterally spaced from the focus 46 of the ions of a lesser mass.

The paths of a stream of ions of a given mass do not all cross precisely at a 180° line focus, and the cross-sectional area of the stream of ions at the region of sharpest focus thereof would normally have an elongated rectangular configuration of substantial width, the width varying with the angular divergence of the ions at the source. The quantity of material transmitted in the beam also varies with the angular divergence at the source, and, with streams of ions of the heavier elements, a practical minimum divergence of ions at the source for collecting commercial quantities of material in the receiver produces 180° foci of such width that the foci of different isotopes overlap considerably. Thus, in practice, the quantities of material collectable at the receiver from one ion stream contain some material from the adjacent ion stream and are merely enriched with respect to a particular isotope.

When employing a uniform magnetic field within the calutron tank, the separation in the beam of ions of different isotopes having the same initial angular divergence is dependent solely upon the mass difference of the ions, and they are spaced apart at their respective 180° foci by an amount approximately equal to the difference in the diameters of their respective paths. By reducing the divergence of the beam at the source, the widths of the respective 180° foci of streams of ions of different isotopes may be reduced and the amount of overlap of these foci correspondingly reduced. However, since the amount of material transmitted in the beam varies with the angular divergence at the source, the amount of overlapping of the 180° foci of streams of ions of different isotopes increases (and the obtainable degree of enrichment of collected material with respect to a particular isotope decreases) as the amount of material transmitted in the beam is increased. As a result, a compromise has been required between maximum production and maximum enrichment.

In order to increase the quantity of material transmitted in an ion beam without reducing the isotopic enrichment of the collected material, the shape or configuration of the beam may be modified by means of specially contoured bodies of magnetically permeable material that are introduced into the calutron tank to cause predetermined variations in the magnetic field along the path of the beam. Such magnetically permeable bodies are referred to as "magnetic shims," and the resulting modified beam is referred to as a "magnetically shimmed beam" or a "shimmed beam." In the above-mentioned patent to Oppenheimer et al., an arrangement of magnetic shims is disclosed, and the configuration of the modified beam resulting from the use of the shims is illustrated and described in some detail. As disclosed in that patent, the modification of the beam is such that the normally elongated, rectangular, 180° focal pattern of each beam component is compressed along one side, is extended along the opposite side, and, in addition, is curved to produce what may be termed a "gull-wing" pattern.

By modifying the 180° focal patterns in this manner, the average width of the pattern for each isotope ion stream is reduced, and the length thereof is increased, whereby the amount of overlapping of the streams of different isotopes is substantially reduced for any given initial angular divergence of ions at the source. This permits increasing the amount of material arriving at the 180° foci of the streams of different isotopes by employing a greater angular divergence at the source without contaminating the material arriving at the 180° focus of one isotope with material arriving at the adjacent focus of another isotope to nearly the extent formerly resulting when a magnetic field of substantially uniform intensity was employed.

However, a study of the locations of the 180° foci of maximum sharpness in streams of ions of different isotopes has revealed that the above-described modification of the magnetic field causes a relative shifting of the foci along the general direction of travel of the beam at the 180° region of focus. It is desirable that a receiver viewing face, that defines the selected portions of the two components of a beam to be received, pass through the most intense portions of the foci of both of the beam components. As a result, the receivers heretofore employed, having a beam viewing face disposed in a plane normal to the general direction of travel of the beam at the 180° region of focus, are unsuited for most efficient separation of the streams of ions of different isotopes from a magnetically "shimmed beam."

In my prior U.S. Patent No. 2,726,336, which issued on December 6, 1955, I disclosed a calutron receiver that was designed for separating with maximum efficiency the isotope components of a "magnetically shimmed" ion beam, which receiver was characterized by a beam viewing face adapted to lie in a plane parallel to the magnetic field and disposed at a selected acute angle with the general direction of travel of the beam at the viewing face, whereby the plane of the viewing face passed through the most intense portions of the adjacent 180° foci of the beam. The receiver illustrated herein is of the general type disclosed in this last-mentioned patent, though, in general, the improvements disclosed herein are of equal utility when applied to receivers for normal or unshimmed beams.

Referring now particularly to Figs. 2 to 7 and 13, the receiver 35 is constructed on a metal frame having an unsymmetrical U-shape as viewed in plan in Fig. 5. This frame comprises a long, horizontally disposed, side leg 51 having a vertically disposed, cross member 52 at one end thereof; a short, horizontally disposed, side leg 53 having a vertically disposed, cross member 54 at one end thereof; and a back member 56 connecting the long side leg 51 and the short side leg 53. A sheet metal housing 60 substantially completely covers the top, bottom, back, and two sides of the U-shaped frame to form a box-like shell open at the forward end.

In front of the forward, open end of this box-like shell is a receiver face plate structure that is assembled on a metal casting 57 having a large, generally rectangular aperture 58 therein and having top and bottom flanges 59. The casting 57 has a longitudinally (vertically) extending 45° bend therein, as indicated at 61. The casting is secured along its vertically disposed side edges to the similarly disposed cross members 52 and 54 of the U-shaped frame by four brackets that include insulator members arranged to insulate the casting 57 from the U-shaped frame. Two such brackets are disposed along one side of the receiver, and each comprises a lug 62 having a suitable split collar formed thereon to receive a tubular insulator 63. The lugs 62 are secured to the cross member 52 of the U-shaped frame by a pair of fastening elements 64, and the split collars are tightened around the respectively associated insulators 63 by fastening elements 66. Respective cap screws 67 extend snugly through the insulators 63 and are tapped into the casting 57, whereby a rigid insulating attachment of the casting 57 to the cross member 52 is provided. The other two brackets are disposed along the opposite side of the receiver, and each comprises a lug 68 having a suitable split collar formed thereon to receive a tubular insulator 69. The lugs 68 are secured to the cross member 54 of the U-shaped frame by a pair of fastening elements 71 (only one being shown), and the split collars are tightened around the respectively associated insulators 69 by fastening elements 72. Respective cap screws 73 extend snugly through the insulators 69 and are tapped into the casting 57, whereby these brackets function similarly to the first two brackets described above.

For the purpose of defining a restricted aperture through which ions may enter the receiver 35, a carbon plate 74, having a convexly curved, thin, beam defining edge 76, is secured to the forward surface of the casting 57 by fastening elements 77; and a second carbon plate 78, having a concavely curved, thin, defining edge 79, is secured thereto by fastening elements 81 that pass through a spacer block 82 adapted to maintain a desired space between the carbon plate 78 and the casting 57. Two complementary shaped upper and lower spacer blocks 83 are disposed between the casting 57 and the carbon plate 78 adjacent the opposite ends thereof respectively, these spacer blocks being secured in place by fastening elements 84 that pass through the carbon plate 78 and through the spacer blocks 83 into the casting 57 and by additional fastening elements 86 that merely pass through the spacer blocks 83 into the casting 57. The carbon plates 74 and 78 are spaced apart so as to define therebetween an elongated curved gap corresponding to the cross-sectional shape of the beam at the 180° region of focus. When the receiver is employed to receive a beam of uranium ions for example, the shape and size of the gap between the carbon plates 74 and 78 should correspond to the combined cross-sectional shape of the $U^{235}$ and $U^{238}$ isotope components of the beam. For purposes of illustration, the relative disposition and configuration of certain other parts of the receiver will be described hereinafter assuming that a uranium ion beam is to be received and that material enriched with respect to the $U^{235}$ isotope is to be separated therefrom.

In order to intercept the $U^{238}$ portion of the beam while permitting the $U^{235}$ portion to pass into a collecting pocket, a carbon electrode 87 is mounted between the carbon plate 78 and the casting 57, in a manner described hereinafter, and projects beyond the carbon plate 78 toward the carbon plate 74 and into the path of the $U^{238}$ portion of the beam to be intercepted thereby. The electrode 87 is provided with a concavely curved, thin, beam defining edge 88 that is spaced from the beam defining edge 76 of the carbon plate 74 so as to define a gap therebetween corresponding to the cross-sectional shape of the $U^{235}$ portion of the beam to be passed to an ion collecting pocket.

The electrode 87 is secured to a backing plate 89 by a number of fastening elements 91 (only one being shown—see Fig. 5), and the backing plate 89 is mounted on a pair of insulating brackets respectively carried by the top and bottom flanges 59 of the casting 57. Each of these insulating brackets comprises a lug 92 that is secured to the adjacent flange 59 of the casting 57 by two fastening elements 93 and is formed with a pair of suitable split collars adjacent the opposite ends thereof to accommodate, respectively, a pair of tubular insulators 94. The split collars are tightened around the respectively associated insulators 94 by fastening elements 96, and the insulators are secured to the electrode backing plate 89 by cap screws 97 that extend snugly through the insulators and are tapped into the electrode supporting plate.

An ion collecting pocket 101 for receiving the $U^{235}$ portion of the beam passing between the defining edges 76 and 88 of the carbon plate 74 and the electrode 87, respectively, is mounted within the box-like shell formed by the housing 60. The pocket 101 comprises a back plate 102, side plates 103 and 104, a bottom plate 106, and a top plate 107 that are preferably secured together at their adjoining edges by a suitable crimped joint construction, such as 108, including removable fastening elements 109, whereby the several plates comprising the pocket may readily be slipped apart at the conclusion of a collection run for easy handling while recovering material deposited thereon during the run. The side plates 103 and 104 and the bottom and top plates 106 and 107 are outwardly flanged at their forward edges to form, respectively, side projections 103a and 104a and bottom and top projections 106a and 107a, all of which are adapted to fit against a flat plate 111 that partially closes the forward end of the pocket. The side projections 103a and 104a may be secured to the plate 111 by suitable screws or the like (not shown), and the bottom and top projections 106a and 107a are respectively clamped between the plate 111 and a pair of substantially coextensive blocks 112. The clamping of each of these projections 106a and 107a between the plate 111 and the associated block 112 may be accomplished with a number of fastening elements 113 spaced along the length of the projection (only one such fastening element being shown for each projection—Fig. 6).

The pocket 101 is supported by a pair of insulating brackets that are respectively disposed above and below the forward end of the pocket and are respectively secured to the blocks 112. Each of these insulating brackets comprises a block 114 that is secured to the casting 57 by two fastening elements 116. The block is formed with a pair of suitable split collars adjacent the opposite ends thereof to receive, respectively, a pair of tubular insulators 117. The split collars are tightened around the respectively associated insulators 117 by fastening elements 118, and the insulators are strengthened to resist the clamping pressure exerted by the collars by having rod-like members 119 inserted snugly therein. The two insulators 117 of the lower insulating bracket extend upwardly into suitable apertures 121 in the adjacent block 112, and the two insulators 117 of the upper insulating bracket extend downwardly into suitable apertures 121 in the other block 112. With this arrangement, the pocket 101 is supported at four points adjacent its forward end while being insulated from the surrounding parts of the receiver.

The plate 111 that partially closes the forward end of the pocket 101 is provided with an aperture 123 having a configuration similar to that of the gap between the defining edges 76 and 88 of the carbon plates 74 and 87, respectively, the aperture 123 being somewhat larger than this gap and aligned therewith so that substantially all ions passing through the gap will also pass through the aperture 123 into the pocket 101.

Because ions entering the pocket 101 are traveling at high speeds they tend to rebound from surfaces interposed in their paths, after being de-ionized, or to cause other de-ionized particles previously deposited on those surfaces to be sputtered therefrom. The resulting scattered and sputtered material flies in all directions from the intercepting surfaces, thereby making it difficult to trap ions entering a pocket with close to 100% efficiency. In order to minimize the amount of neutralized material scattered or sputtered out of the pocket 101 through the aperture 123, the pocket is formed with the side walls 103 and 104 thereof diverging from their forward edges toward the back wall 102 of the pocket, the amount of this divergence being such that the interior surfaces of these side walls are substantially free from direct bombardment by ions entering the pocket through the aperture 123. The amount of divergence necessary to accomplish this result is, of course, dependent in part upon the distance between the side walls 103 and 104. The pocket is so oriented that the side walls 103 and 104 diverge in opposite directions from the general direction of travel of the beam at the receiver and so that ions moving in the general direction of travel of the beam (0° divergence) strike the back wall 102 of the pocket approximately midway between the side edges thereof.

In order that the rate at which ions are entering the pocket 101 may be determined during a collection run, an electrical lead 126 is connected to the pocket and is run out of the receiver housing through a suitable insulating ferrule 127 and out of the calutron tank through the conduit 34 to a grounded meter (not shown). Thus, electrons required to neutralize ions entering the pocket will be drawn thereto through the meter and through the electrical lead 126, and the meter reading will provide an indication of the rate of ion reception in the pocket.

For beam monitoring purposes and for providing an indication of the condition of the beam during a run, it is desirable to ascertain the rate at which ions from the relatively $U^{238}$ portion of the beam are intercepted by the electrode 87. Because of the intense bombardment of this electrode, it is also desirable that cooling means therefor be provided. To these ends, a supply branch 128 of a cooling fluid line is brought into the calutron tank through the conduit 34 and into the receiver housing 60 through a suitable insulating ferrule 129. From the ferrule 129 at the back of the receiver, the supply branch 128 of the cooling fluid line extends forwardly into contact with the electrode backing plate 89 and in a loop around the lower surface of the backing plate. The cooling fluid line is preferably made of flexible copper tubing or the like so that it may be soldered to the backing plate 89 to achieve efficient heat transfer therebetween. Cooling fluid introduced into the receiver through the supply branch 128 of the cooling fluid line may be passed out of the receiver and liner and out of the tank again by means of a return branch 130, similar to the supply branch 128, that passes out of the receiver through another insulating ferrule 129. By employing a nonconducting cooling fluid and by insulating the cooling fluid line in any suitable manner from other parts of the calutron, the cooling fluid line may be employed as an electrical lead for connecting the electrode 87 through a meter to ground for reading currents to the electrode.

To close the pocket 101 for preventing the reception of ions during initial focusing of the beam and from time to time during a collection run if beam conditions should deteriorate, a swinging type door 131 is provided that is adapted to move between a closed position (Fig. 5), shielding the gap between the carbon plates 74 and 87, and an open position (Fig. 1) out of the path of the U+ portion of the beam. The door 131 comprises a carbon plate 132 that is secured to a backing plate 133 by fastening elements 134 and that is provided with a convexly curved, thin, beam defining edge 136 spaced a small distance from the beam defining edge 79 of the carbon plate 78 when the door is in its closed position. The backing plate 133 is provided with a pair of lugs 137 adjacent the top and bottom edges thereof respectively, and these lugs are rigidly secured to a vertically disposed shaft 138 rotatably mounted in three lugs 139 that project from the casting 57, whereby the door 131 may be caused to swing between its open and closed positions by rotation of the shaft 138.

A beveled pinion 141 is mounted on the shaft 138 and keyed thereto, and a beveled gear 142 is mounted on and keyed to a horizontal shaft 143 for driving the pinion 141. The horizonal shaft is suitably journaled in the casting 57 adjacent the gear 142 and extends rearwardly therefrom to a short rod 144 of electrical insulating material, such as Bakelite, into one end of which the shaft 143 is anchored, in any suitable manner for transmitting torque. A horizontally disposed extension 143a of the shaft 143 is similarly anchored at one end in the insulating rod 144 and extends rearwardly therefrom into one end of a similarly disposed shaft 145 of greater diameter. The shafts 143a and 145 are coupled, by means of a pin 146 in the shaft 143a and a slot 147 in the shaft 145, in a manner permitting limited, relative, longitudinal movement of the shafts. The shaft 145 extends through an aperture 148 in the back member 56 of the receiver frame and is provided with an integral collar 149 extending radially beyond the aperture 148 and engaging the member 56. A bearing block 151 is anchored to the member 56 by fastening elements 152 and is provided with an aperture 153 adapted to receive the shaft 145, the aperture 153 being enlarged, as shown at 154, to accommodate the collar 149. The shaft 145 is thereby journaled in the bearing block 151 and is anchored against longitudinal movement with respect to the receiver frame. The shaft 145 extends a short distance rearwardly from the receiver frame and is joined to an extension 145a thereof by a metal coupling member 156, including two pins 157. The extension 145a extends still further rearwardly through and beyond the liner end wall 29 and is journaled in the liner end wall by a bearing structure 158, described hereinafter, in such manner that it may be rotated and moved longitudinally of is axis in the bearing.

The receiver 35 is mounted in the liner 28 in a manner permitting adjustment of its position forwardly and rearwardly for positioning the receiver viewing face properly with respect to the 180° foci 46 and 47 of the $U^{235}$ and $U^{238}$ components of the beam, respectively. Suitable structure permitting such movement is provided and comprises two, laterally extending, receiver supporting arms 161 that are respectively mounted adjacent opposite ends of the long side leg 51 of the receiver frame and a similar, oppositely extending, receiver supporting arm 162 that is mounted adjacent the rearward end of the short side leg 53 of the receiver frame. These three arms are rigidly secured to the receiver frame by fastening elements 163, and each terminates at its outer end in a track engaging member. The track engaging members 164 of the two arms 161 respectively consist of metal blocks that are secured to their respective arms by fastening elements 166 and that are provided with relatively aligned grooves in their lower surfaces adapted to receive a track member 167 for maintaining alignment of the receiver with its path of travel as it is moved therealong. The track engaging member 168 of the third arm 162 merely comprises an elongated block that is adapted to assist in supporting the receiver while resting upon and sliding along a second track member 167 without otherwise affecting the alignment of the receiver. The two track members 167 are mounted at their rearward ends in bosses 169 carried by the liner 28 adjacent its end wall 29. At their opposite ends, the track members are mounted in suitable apertures provided in two vertically disposed structural members 171 that respectively project inwardly from opposite side walls of the liner. Being supported in this manner, the receiver may be moved back and forth along the track members 167 by appropriate manipulation of the shaft 145a in a manner described hereinafter.

Because of the small vertical clearance between the receiver and the top and bottom walls of the liner 28, two upper guide members 172 are respectively secured to the cross members 52 and 54 on opposite sides of the receiver frame by suitable fastening elements and project upwardly into contact with the top wall of the liner. Two lower guide members 173 are similarly secured to the cross members 52 and 54 on opposite sides of the receiver frame and project downwardly into contact with the bottom wall of the liner. Thus, in case of warping or slight misalignment of the top or bottom wall of the liner, the upper and lower guide members 172 and 173 will serve to hold the top and bottom walls of the liner out of contact with the relatively delicate receiver viewing face structure.

The shaft 145a is operatively connected to the receiver 35, in the manner described above, so that the door 131 may be moved between its open and closed positions by rotating the shaft 145a, and the receiver may be moved back and forth along the supporting track structure by axial movement of the shaft 145a.

The bearing structure 158 adjacent one end of the shaft 145a comprises a sleeve 176 having an annular flange 177 that is adapted to bear against the outer surface of the liner end wall 29. The sleeve 176 projects through the liner end wall and is threaded to accommodate a nut 178 and washer 179 by means of which the bearing sleeve is securely anchored in place.

From the bearing structure 158, the shaft 145a extends further rearwardly through an aperture 181 in the removable tank wall 24 and is operatively connected beyond the tank wall 24 to apparatus, now to be described, by means of which leakage of air into the tank is prevented while enabling manual manipulation of the shaft 145a from outside the tank. This apparatus comprises a hollow, steel cylinder 182 having an annular flange 183 adapted to bear against the tank wall 24 around the aperture 181 therein. The flange 183 has a number of annular sealing rings 184 seated therein, and a number of studs 186 pass through the flange and are tapped into the tank wall 24 for holding the sealing rings tightly against the tank wall. Adjacent its opposite end the cylinder 182 is provided with a closure disk 187 having a central aperture 188 therein, and a conduit 189 projects a short distance through the aperture 188 into the cylinder 182 and is rigidly connected to the closure disk 187, as by welding. A shaft 191 extends completely through the conduit 189 into the interior of the cylinder 182, with the space between the shaft and the surrounding conduit sealed by means of a conventional Wilson seal (not shown), having a pump-out conduit 192, in a manner permitting rotative and axial movement of the shaft 191.

Inside the cylinder 182 the shafts 145a and 191 are coupled together and insulated from each other by means of a coupling structure shown in detail in Figs. 8, 10, 11, and 12. This structure includes a cylindrical insulator 193 that is secured at one end to the shaft 145a by a coupling arrangement detailed in Figs. 9 and 10 and including a cap member 194 having a threaded, hollow projection 196 adapted to be surrounded by a cup-shaped cap 197. The cap member 194 surrounds the adjacent end of the insulator 193 and is secured thereto by means of a cap screw 198 and a plurality of set screws 199, and the shaft 145a projects into the cup-shaped cap 197 and into the projection 196 on the first cap member 194. The end of the projection 196 is formed with a slot 201 therein, and the adjacent end of the rod 145a is provided with a transverse pin 202 that projects into the slot 201, whereby both relative longitudinal movement and relative rotary movement between the shaft 145a and the coupling structure are prevented. On the opposite end of the insulator 193, a cap 203 having a pair of oppositely extending ears 204 is rigidly mounted in any desired manner, as by cementing the cap on the insulator. A plate 206 having oppositely projecting ears 207 and a hollow, threaded, axial projection 208 abuts the end of the cap 203 and is secured thereto by means of fastening elements 209 that pass through the ears 204 and 207 of the cap and the plate. A cup-shaped cap 211 is threaded over the projection 208 on the plate 206 and is firmly secured thereon by means of a set screw 212, and the adjacent end of the shaft 191 projects through the cup-shaped cap 211 and into the hollow portion of the projection 208 on the plate 206. A slot 213 in the end of the projection 208 and a co-operating pin 214 in the adjacent end of the shaft 191 serve to connect the shaft 191 to this end of the coupling structure in a manner preventing both relative longitudinal and relative rotary movement thereof.

At its outer end beyond the conduit 189, the shaft 191 is provided with a hand wheel 216 that is suitably keyed to the shaft for manually turning it to operate the receiver door 131 and for moving it longitudinally for adjusting the position of the receiver with respect to the $U^{235}$ and $U^{238}$ foci 46 and 47, respectively. In order to provide a visual indication of the position of the receiver 35 along its path of travel, a pointer 217 is mounted on a rod 218 that is bent at right angles adjacent one end and is provided beyond the bend with an apertured, enlarged terminus 219 adapted to fit around the shaft 191. Two collars 221 are suitably secured on the shaft 191 on opposite sides of the ear 219 for causing the rod 218 and the associated pointer 217 to move longitudinally with the shaft 191. The rod 218 is slidably supported at spaced-apart positions on opposite sides of the pointer 217 by a pair of collars 222 that surround the cylinder 182 and are provided with ears 223 that are apertured to receive the rod 218 and permit longitudinal sliding movement thereof. A suitable scale 224 is mounted on the cylinder 182 between the collars 222, and the scale, the pointer, and the surrounding structure for the pointer are so proportioned as to accommodate movement of the receiver 35 along a path of the desired length and to indicate the position of the receiver along that path.

The operation of the calutron and the functioning of the receiver per se are substantially identical with the operation of the apparatus disclosed in my above-mentioned U.S. Patent No. 2,726,336, and do not differ materially from the general mode of operation of the calutrons disclosed in the other patents mentioned herein. With reference to the receiver per se, one of the significant differences involves the improved structure of the ion receiving pocket 101 which, as mentioned above, is designed more effectively to retain the selected ions permitted to pass by the anterior receiver viewing face structure into the pocket. Another difference of significance involves the structure of the receiver viewing face and the cooperative relation of the door 131 thereto. By positioning the beam defining carbon 78 a substantial distance ahead of the electrode 87, the likelihood of a short developing between the electrode and the beam defining carbon 78, as a result of the accumulation therebetween of de-ionized particles intercepted by the electrode, is minimized. As noted above, the thin edge 136 of the door 131, when the door is in its closed position, is spaced slightly from the thin edge 79 of the beam defining carbon 78, whereby a narrow cross section of the most intense portion of the beam (the $U^{238}$ component) will pass therebetween and impinge upon the electrode. Thus, while the door is closed, the accuracy of focus of the beam may be ascertained from the current to the electrode 87 resulting from the interception thereby of the above-mentioned narrow restricted portion of the beam.

In addition to the differences in the receiver per se, the manner in which the receiver is mounted in accordance with the present invention permits ready adjustment of the position of the receiver with respect to the beam and manipulation of the door 131 by means of a single control shaft projecting through the removable wall 24 of the tank. The consequent reduction in the number of movable control members passing through this tank wall obviously minimizes the points at which leakage of air into the tank may occur and simplifies the receiver controlling structure that must be mounted on this tank wall.

While I have described in detail a specific embodiment of my invention, it is to be understood that this has been done for illustrative purposes and that the scope of my invention is not limited thereby except as required by the appended claims.

What is claimed is:

1. An ion receiver adapted to be mounted in a calutron tank adjacent a region of focus of a polyisotopic ion beam for receiving a selected portion thereof, comprising an ion receiving pocket having a front wall defining an opening for admitting into the pocket a selected portion of said beam, and a pair of side walls that are joined to said front wall on opposite sides of said opening and that extend generally rearwardly therefrom in diverging relation to each other and to the general direction of travel of ions at said opening.

2. In an ion receiver adapted to be mounted in a calutron tank adjacent a region of focus of a polyisotopic ion beam for receiving a selected portion thereof and having a face plate defining a beam delimiting aperture for passing a selected portion of the beam; an ion receiving pocket having a front wall containing an opening aligned with said beam delimiting aperture for admitting ions passed thereby into the pocket, a back wall disposed in the path of ions entering the pocket through said opening, and a pair of side walls extending between said front and back walls on opposite sides of said opening in rearwardly diverging relation to each other and to the general direction of travel of ions at said opening.

3. In a calutron having an evacuated tank containing means for projecting an ion beam toward a region of focus disposed within the tank, track structure mounted within the tank adjacent said region of focus, an ion receiver mounted for movement along said track structure, and means for adjusting the position of said receiver along said track structure including a control positioned exteriorly of said tank.

4. In a calutron having an evacuated tank containing means for projecting an ion beam toward a region of focus disposed within the tank, track structure mounted within the tank, an ion receiver mounted for movement along said track structure in a direction parallel to the general direction of travel of said beam at its region of focus, and means for adjusting the position of said receiver along said track structure including a control positioned exteriorly of said tank.

5. In a calutron having an evacuated tank containing means for projecting an ion beam toward a region of focus disposed within the tank, receiver supporting structure including a pair of tracks disposed within the tank on opposite sides of said region of focus and extending parallel to the general direction of travel of said beam at said region of focus, a receiver mounted on said tracks for movement therealong, and means for adjusting the position of said receiver along said track structure including a control positioned exteriorly of said tank.

6. In a calutron having an evacuated tank containing means for projecting an ion beam toward a region of focus disposed within the tank, receiver supporting structure including a pair of tracks disposed within the tank on opposite sides of said region of focus and extending parallel to the general direction of travel of said beam at said region of focus, a receiver mounted on said tracks for movement therealong, and a longitudinally movable shaft disposed parallel to said tracks and secured at one end to said receiver and projecting through a vacuum seal in a wall of said tank to the exterior thereof, whereby longitudinal movement of said shaft will produce a corresponding movement of the receiver along said tracks.

7. In a calutron having an evacuated tank containing means for projecting an ion beam toward a region of focus disposed within the tank, an ion receiver including means defining an aperture for admitting ions thereto and a door mounted for movement between open and closed positions with respect to said aperture, structure supporting said receiver within said tank for movement along a path passing through said region of focus, means for adjusting the position of the receiver along said path including a longitudinally movable shaft rotatably secured at one end to the receiver and projecting through a wall of said tank to the exterior thereof, and means operative in response to rotation of said shaft for moving said door between its open and closed positions.

8. An ion receiver adapted to be mounted in a calutron tank adjacent a region of focus of a polyisotopic ion beam for receiving a selected portion thereof, comprising a beam viewing face including first and second ion receiving areas respectively normally adapted to receive first and second selected portions of said beam, a baffle disposed ahead of said first area for defining one side of the first portion of the beam received thereby, and a door mounted for movement between an operative position completely shielding said second area and an inoperative position at one side of said second area, said door being disposed when in its operative position in spaced relation to said baffle such that only a fragmentary part of said first portion of the beam may pass therebetween to said first area.

9. An ion receiver adapted to be mounted in a calutron tank adjacent a region of focus of a polyisotopic ion beam for receiving a selected portion thereof, comprising a beam viewing face including means defining an aperture for normally passing one selected portion of said beam to the interior of the receiver, an electrode for normally intercepting another selected portion of said beam, a baffle disposed ahead of said electrode for defining one side of the portion of the beam normally intercepted thereby, and a door mounted for movement between an operative position completely shielding said aperture and an inoperative position to one side of said aperture, said door being disposed when in its operative position in spaced relation to said baffle such that only a fragmentary part of the portion of the beam normally intercepted by said electrode may pass thereto between the door and the baffle.

10. An ion receiver adapted to be mounted in a calutron tank adjacent a region of focus of a polyisotopic ion beam for receiving a selected portion thereof, comprising a beam viewing face including means defining an aperture for normally passing one selected portion of said beam to the interior of said receiver, an electrode for normally intercepting another selected portion of said beam, a beam delimiting baffle disposed ahead of said electrode for partially shielding the beam, and a door mounted for movement between an inoperative position to one side of said aperture and an operative position completely shielding said aperture, one side edge of the door in its operative position being spaced from said baffle by an amount substantially less than the width of the portion of the beam normally intercepted by said electrode for defining a beam delimiting slot of a width adapted to pass to the electrode a delimited fragment only of the portion of the beam normally intercepted thereby.

References Cited in the file of this patent

UNITED STATES PATENTS 2,457,162     Langmuir _____ Dec. 28, 1948

OTHER REFERENCES

Physical Review, volume 20, 2nd series, 1922, pp. 631–638, "Positive-Ray Analysis of Potassium, Calcium and Zinc," by Dempster.